(12) United States Patent
Wirz et al.

(10) Patent No.: US 7,682,223 B2
(45) Date of Patent: Mar. 23, 2010

(54) GEAR MANUFACTURING MACHINE AND PROCESS FOR THE OPERATION OF SUCH A GEAR MANUFACTURING MACHINE

(75) Inventors: Walter Wirz, Pfaffikon (CH); Erich Ronneberger, Waldshut-Tiengen (DE); Helmut Jager, Konigsbach-Stein (DE)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 11/516,566

(22) Filed: Sep. 7, 2006

(65) Prior Publication Data
US 2007/0060022 A1 Mar. 15, 2007

(30) Foreign Application Priority Data
Sep. 12, 2005 (DE) .................. 10 2005 043 602

(51) Int. Cl.
*B24B 49/00* (2006.01)
(52) U.S. Cl. .................. 451/11; 451/5; 451/57
(58) Field of Classification Search ............... 451/5, 451/10, 11, 14, 24, 52, 47, 57, 61; 29/898, 29/898.09, 27 C, 33 P, 563; 125/11.01, 11.23; 409/25–30, 221, 224, 165, 168
See application file for complete search history.

(56) References Cited

U.S. PATENT DOCUMENTS

| | | | | |
|---|---|---|---|---|
| 4,673,076 A | * | 6/1987 | Mattson | 198/346.2 |
| 5,257,882 A | * | 11/1993 | Stadtfeld et al. | 409/26 |
| 5,390,446 A | * | 2/1995 | Kazui et al. | 451/8 |
| 5,624,301 A | * | 4/1997 | Lenz et al. | 451/47 |
| 5,772,494 A | * | 6/1998 | Muraki et al. | 451/52 |
| 6,357,994 B1 | * | 3/2002 | St. Onge | 414/738 |
| 6,647,605 B2 | * | 11/2003 | Hiramoto et al. | 29/33 P |
| 6,679,369 B2 | * | 1/2004 | Okuyama | 198/346.1 |
| 6,860,380 B2 | * | 3/2005 | Watanabe et al. | 198/750.11 |
| 6,893,323 B2 | * | 5/2005 | Dougill et al. | 451/11 |
| 7,013,544 B2 | * | 3/2006 | Yasuda et al. | 29/27 C |
| 2002/0154962 A1 | * | 10/2002 | Hiramoto et al. | 409/159 |
| 2004/0171334 A1 | * | 9/2004 | Turnac et al. | 451/65 |

FOREIGN PATENT DOCUMENTS

| | | |
|---|---|---|
| DE | 101 37 314 A1 | 2/2003 |
| JP | 7 237036 | 9/1995 |
| JP | 7 276181 | 10/1995 |

\* cited by examiner

*Primary Examiner*—Dung Van Nguyen
(74) *Attorney, Agent, or Firm*—Browdy & Neimark, PLLC

(57) ABSTRACT

The invention concerns a device for the automatic loading of workpieces into a gear manufacturing machine, in particular a hard state finishing machine, by means of a swivel device arranged on the machine, where simultaneous with the machining process of a work piece blank (2) clamped on the work spindle (1) a finish machined work piece (2) on the transfer platform (8) located opposite the work spindle is de-oiled in a work piece loading lock, removed, and a fresh work piece blank fed in. The transfer platform (8) is designed as a centrifuge station.

19 Claims, 4 Drawing Sheets

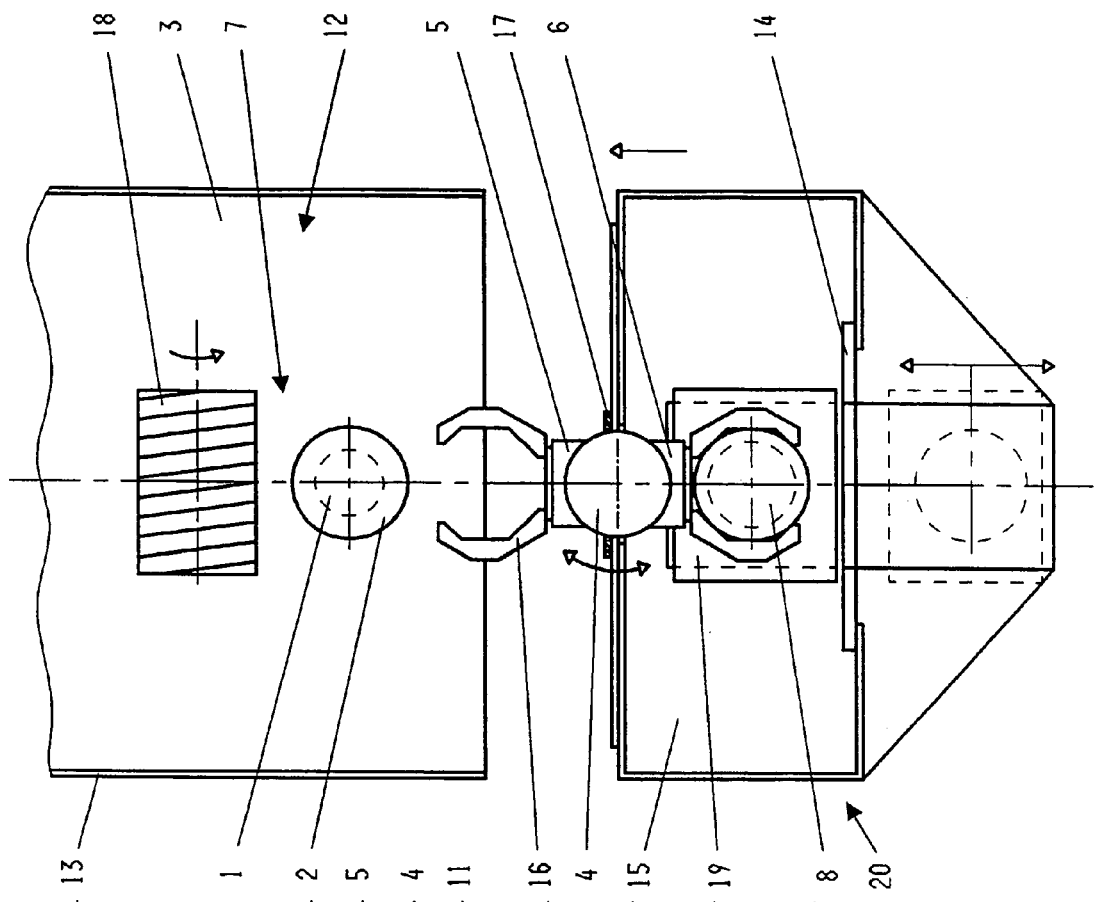

GEAR MANUFACTURING MACHINE AND PROCESS FOR THE OPERATION OF SUCH A GEAR MANUFACTURING MACHINE

FIELD OF THE INVENTION

The present invention concerns a gear manufacturing machine, and in particular a hard state finishing machine and a process for the operation of such a gear manufacturing machine.

BACKGROUND OF THE INVENTION

Gear tooth machining is a relatively expensive process in the field of gear unit production. This applies already to soft state machining, but in particular to machining after hardening, i.e. to precision hard finish machining. High capacity and high precision machines are required which, according to the high targeted ultimate accuracy of the gear teeth, must clamp the work pieces precisely, align the premachined tooth spaces accurately relative to the machining tool, and finally produce the desired geometry. Machining methods known today are chiefly grinding, but also hard milling, honing, skive hobbing, hard skiving and other processes.

Due to the expensive operation of tooth machining, but in particular hard finish machining, it is of the greatest interest to trim the machines for the highest possible productivity, and simultaneously to reduce idle times as far as possible. In recent years it has been possible to improve the machining processes such that they have become several times more productive. At the same time the feeding of the machines with work pieces has to a large extent progressed from the previously usual hand loading to automatic loading. Nowadays with the masses of gears being produced, the pure machining times often exceed the idle times by a negligible amount only—this not least due to the very unfavorable conditions for work piece handling, since the oils used in the process for cooling and lubrication, and the fine swarf produced by the machining operation are detrimental to a trouble free and exact loading of the machine. From this aspect it is obvious that a reduction of idle times and a lessening of the side effects of the process cooling/lubrication can contribute greatly to a further increase in efficiency.

Devices for a quick work piece change have long been known. On a hobbing machine, for example, by means of a ring loader fitted with two work piece grippers and swivel located on the machine body, a work piece blank and a finished work piece are grasped simultaneously and exchanged one for the other. The work piece blank is swiveled from a loading transfer platform outside the machine to the clamping device on the work spindle in the working area, and placed onto the said spindle, whilst at the same time the finished component is drawn off the clamping device and swiveled to the transfer platform. The disadvantage of this method is that the loading elements are totally exposed to the coolant/lubricant and the swarf precipitation, and that the finish machined work piece is very oily from the machining operation and is forwarded in this condition to the follow-up system.

Methods are also known by which the workpieces are brought into the working area through an opening closable by a loading door by means of a rapid robot or robot resembling device with dual grippers. The disadvantages of these solutions are the relatively large amount of apparatus required, the sensitivity to vibration, and the relative inaccuracy of work piece positioning due to the loading system being mostly located way outside the machine, and here again the discharge of oily dripping workpieces.

Machines with a rapid work piece changer are used to advantage in mass production, such as in automobile gear box manufacture, where the machine must seldom be setted up for a different work piece, and the cost of the automation can be amortized within a short time. In medium and small series production however, where the machine is setted up relatively frequently, automatic work piece loading is often not economic due to set up costs. Here a standard machine without automatic work piece loading is often given preference.

From the point of view of the machine manufacturer, therefore, the optimum economic solution is a high performance standard machine which can be supplied with or without a work piece loading device. In the case of the known solutions with rapid integrated loading system, the constructional deviations from the relevant standard machine with manual loading are so great however, that the high demands on a high performance automation cannot be fulfilled by the simple supplementation of the standard machine with a work piece loader.

SUMMARY OF THE INVENTION

An object of the present invention is to create a gear manufacturing machine with which, in spite of the modest amount of devices employed, the idle time is substantially shortened, the loading elements are essentially protected from coolant/lubrication media and swarf, and the finished parts are de-oiled before leaving the machine, and also to provide a process for operating the machine. Included in the set task it should moreover be possible to present a solution for the automation of a machine by which, by means of connecting a separate loading module, minimum resources and minimum modifications are required to convert a hand loaded machine to a machine with a high performance automatic work piece loader, without losing the advantages of an integrated system, such as ease of transport as a complete unit, use of the operating media and control systems of the machine etc.

According to the invention the object is achieved by the entirety of the features in the claims. The core of the invention resides in designing the transfer platform as a centrifuge station. This provides the ability to clean the finished parts in an easy and time-saving manner within the machine immediately after machining.

A first feature of the gear manufacturing machine according to the invention is that between the machine working area and the transfer area a fixed partitioning wall is located, which is provided with closable openings through which the work blanks and finished parts are swung unhindered, and which said wall in the closed state separates the machine working area from the transfer area, sealing against oil mist and splashes.

Another feature of the gear manufacturing machine according to the invention is that to close the openings in the partitioning wall loading doors are provided, which are arranged to slide in the plane of the partitioning wall, that the swivel device comprises a swivel shaft located for swiveling about a vertical axis, which said shaft can be raised and lowered and is fitted with two swivel arms arranged mutually opposite, and that the transfer area is designed as a loading lock enclosed by the machine bed, a machine casing, the partitioning wall to the machine working area, and a transfer door, the transfer door sealing this loading lock off—oil mist and splash proof—from the machine surroundings, and that the transfer door and the openings in the partitioning wall cannot be opened simultaneously.

A preferred feature of the gear manufacturing machine according to the invention is that a finished work piece on the transfer platform can only be centrifuged when the transfer area is closed.

For keeping the transfer area clean it is of advantage to provide a lowerable splash guard in the transfer area to cover the transfer platform during centrifuging, in particular in the form of a hood lowerable over the finished work piece.

A further development of this feature is that the transfer platform is vibration insulated relative to the machine bed, or installed directly on the floor independent of the machine bed.

Undesirable influence on the machining process due to the cleaning process can thereby safely be avoided. In the case of independence of the transfer platform from the machine bed, this section of the machine can optionally be added in the form of a modular structure.

The openings in the partitioning wall and the transfer door can be made to advantage for automatic opening and closing.

Similarly the swivel arms can be designed as automatically actuated work piece grippers.

Within the scope of the invention it is also feasible that the swivel arms be designed as form-locking work piece support elements.

The oil mist and splash proof separation of the areas by the partitioning wall is facilitated if the swivel shaft carrying the swivel arms is cylinder shaped, the swivel shaft bearing the swivel arms being preferably located at both ends for rotation and axial displacement. For optimum sealing, the edges of the loading doors contacting the swept surface of the swivel shaft are provided with lip seals.

In order to facilitate the loading and unloading of the transfer platform, it is an advantage if the transfer platform is arranged on a slide retractable out of the transfer area for loading and unloading from above.

Another modular version of the gear manufacturing machine according to the invention provides for the swivel shaft and the transfer platform, complete with partitioning wall with loading doors and transfer door, to be arranged separate from the machine bed and the machine casing directly on the floor in a separate casing, which is joined to the machine casing by oil mist and splash proof connection, where in particular the module is detachable from the rest of the machine.

A later re-equipment with the module is especially simple if for its own operating media supply the module can be connected to the internal supply of the gear manufacturing machine, especially with respect to coolant/lubrication, oil mist extraction and hydraulic, pneumatic, electrical and control systems.

A preferred feature of the operating process according to the invention is that the loading doors in the partitioning wall between working area and transfer platform are open during the swivel action of the swivel arms, that the transfer door of the loading lock is open during the removal of a finished work piece and the loading of a work piece blank, that the transfer platform is designed as a centrifuge station, and that both loading doors and the transfer door are closed when a finished work piece is centrifuged on the transfer platform.

BRIEF DESCRIPTION OF THE DRAWINGS

In the following the invention is explained in detail by way of a preferred embodiment, which is illustrated in the annexed drawings. The drawings depict.

DETAILED DESCRIPTIONS OF PREFERRED EMBODIMENTS

Figure 1:
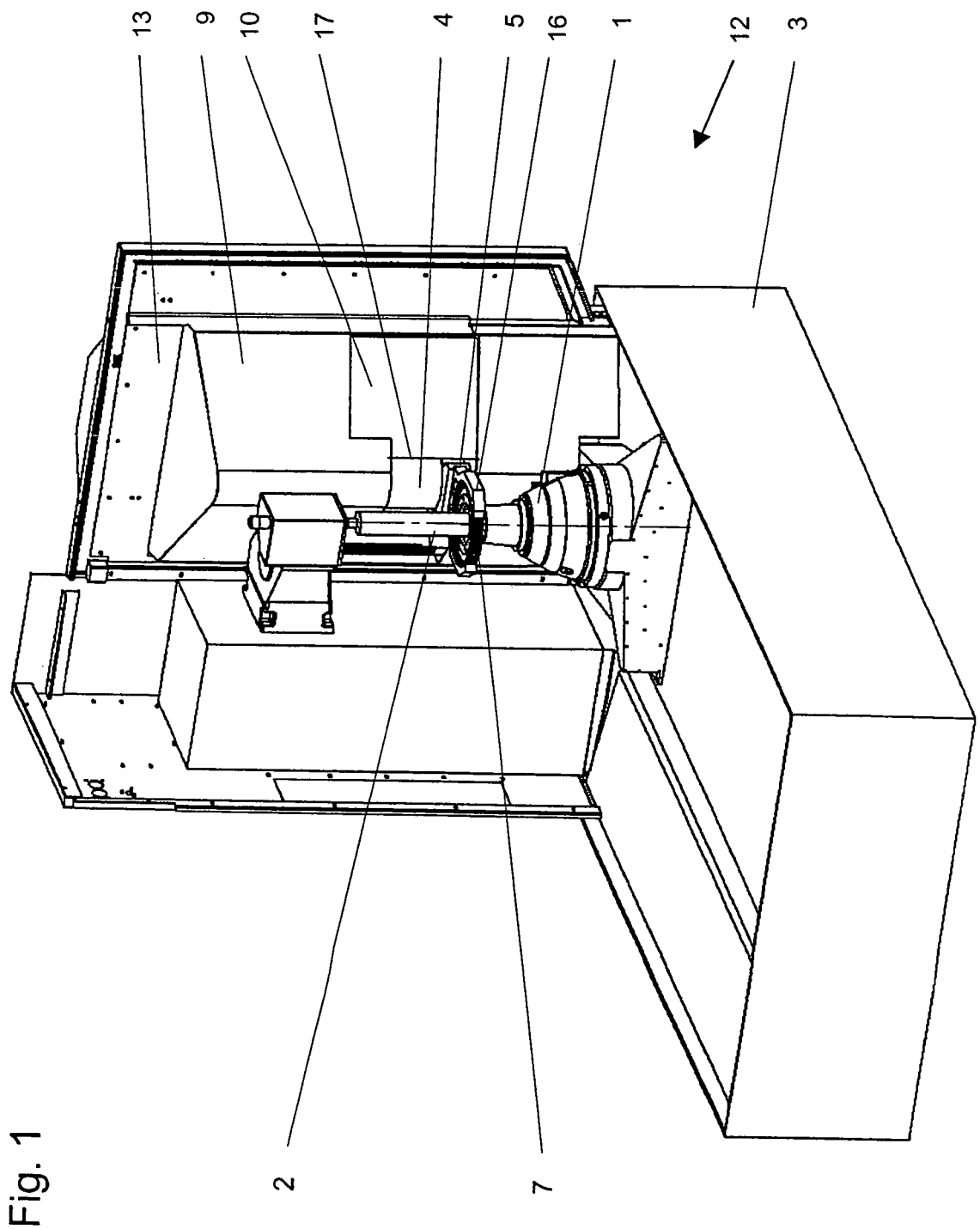
FIG. 1 A diagrammatic representation of the work piece sector of the working area of a gear manufacturing machine, FIG. 2 an enlarged diagrammatic representation of the work piece sector of the working area of a gear manufacturing machine acc. to FIG. 1, with loading doors open, FIG. 3 an enlarged diagrammatic representation of the work piece sector of the working area of a gear manufacturing machine acc. to FIG. 1, with loading doors closed, FIG. 4 a diagrammatic representation of the work piece sector outer wall of the machine according to FIG. 1 with transfer door open, FIG. 5 a diagrammatic representation of the work piece sector outer wall of the machine according to FIG. 1 with transfer door closed, FIG. 6 a plan view simplified representation of a sample embodiment of the invention, in which the transfer area including the swiveling device is part of a separate module designed as loading lock and retractable from the machine, and FIG. 7 in similar representation to FIG. 6, the machine as in FIG. 6 with the module retracted.
Figure 2:
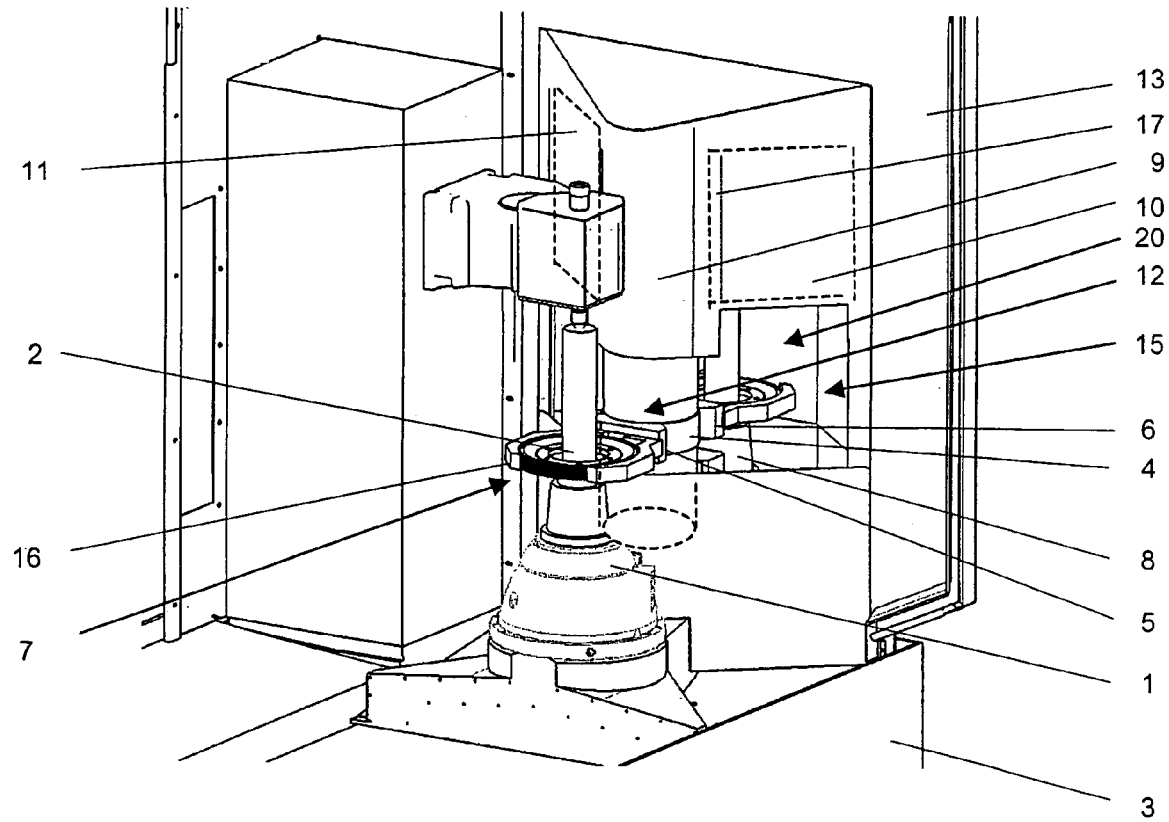
Figure 3:
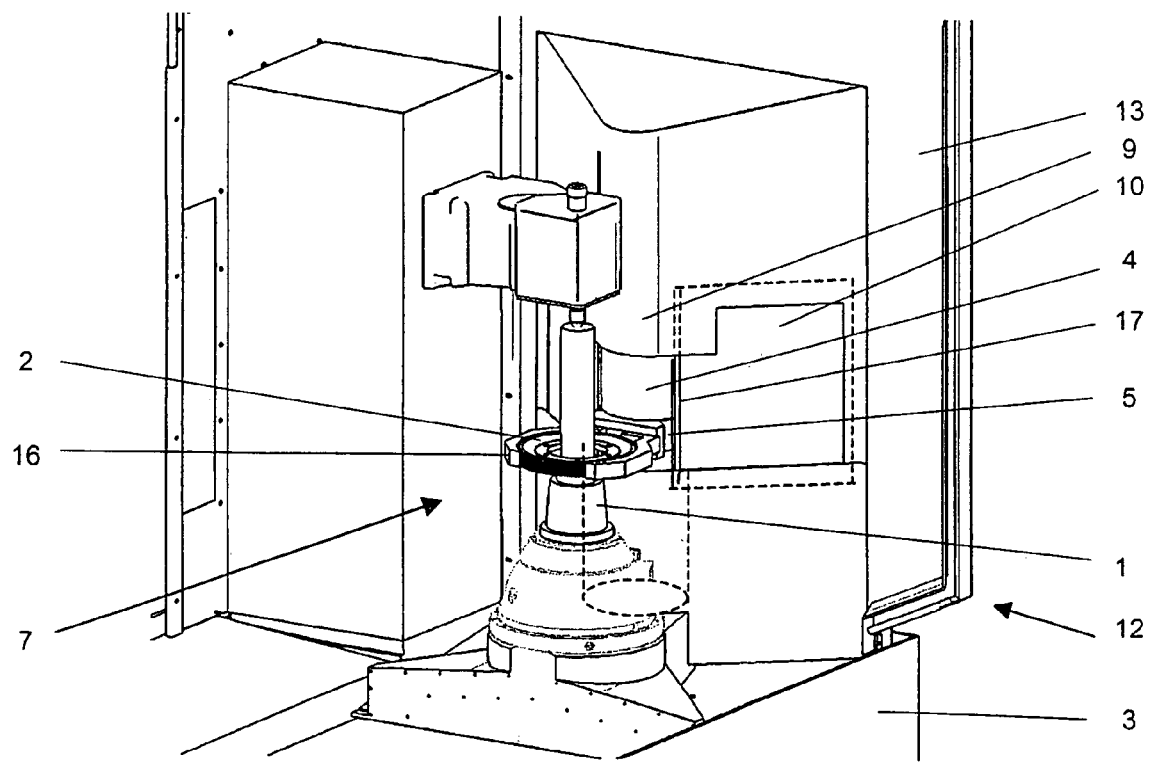
Figure 4:
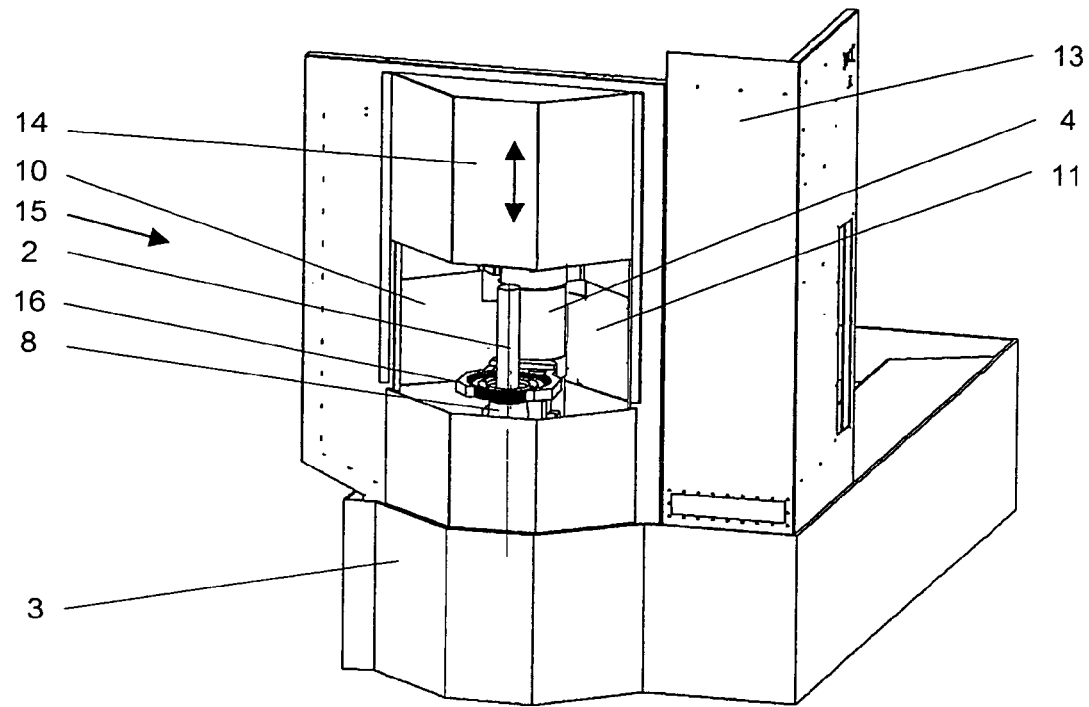

The invention is described in detail using the example of a tooth flank grinding machine. FIGS. 1 and 2 show diagrammatic views of the work piece sector of the area inside the machine. Clamped on a work spindle 1 located in the machine bed 3 for rotation about a vertical axis is a work piece 2, which is enclosed by a work piece gripper 16. Behind the work piece 2 the machine working area 12 is shut off from the adjacent transfer area (20 in FIG. 2) by a partitioning wall 9. Arranged vertically displaceable in the partitioning wall are two loading doors 10, 11, which are closed in FIGS. 1 and 3, and open in FIG. 2. For the sake of clarity the grinding tool sector of the machine has been omitted.

The work piece gripper 16 holding the work piece 2 in machining position is the first of two mutually opposite swivel arms 5, 6 designed as work piece grippers, which are fixed to a cylindrical swivel shaft 4 located for rotation about a vertical axis and for raising and lowering relative to the machine bed. The two swivel arms are of like design, and their purpose is to pick up a waiting work piece blank from the transfer platform 8 in the transfer area 20, swivel it to the machining position 7, push it onto the work spindle 1, grasp it again after the machining, lift it off the work spindle 1, and after renewed swiveling place it back on the transfer platform 8. Here the finished component is exchanged for a new work piece blank by hand or by a suitable handling system. During the machining of the work piece 2 the work piece gripper 16 is open.

In a preferred embodiment (not shown in the drawings) the swivel shaft 4 is connected at its upper and lower ends for swiveling and for raising and lowering relative to the machine bed 3.

During the machining of the work piece 2 and—thanks to the dual gripper principle—the simultaneous finished part removal and re-loading of the transfer platform 8, the machining position 7 and the transfer platform 8 are mutually separated oil mist and splash proof from each other by the partitioning wall 9 and the closed loading doors 10, 11, independent of the vertical position or stroke action of the gripper arms 5, 6 during the loading operation, in order to safely protect the transfer platform 8 against oil splash and swarf. In order to assure sealing, the loading doors 10, 11 are provided with lip seals 17 on their edges contacting the swept surface of the swivel shaft 4. The loading doors 10, 11 are open exclusively during the swiveling of the swivel arms 5, 6, in order to permit collision free passage of the work piece 2 and swivel arm 5, 6 through the partitioning wall 9.

Figure 5:
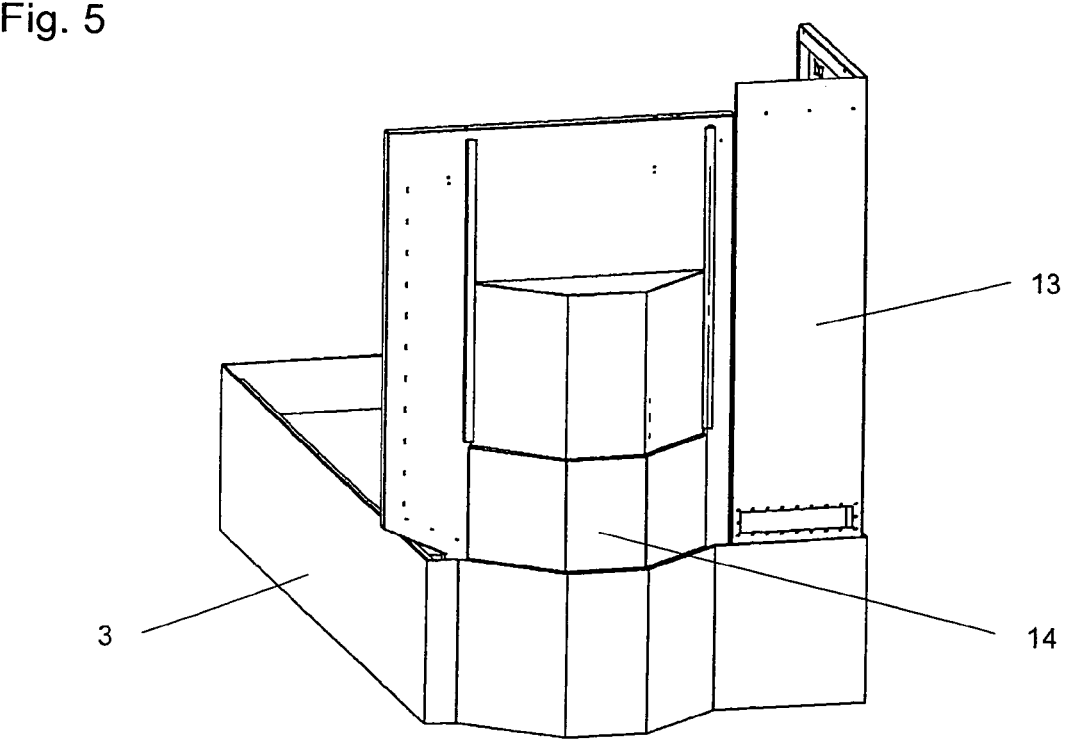

The transfer platform 8 is housed in a loading lock 15 enclosed by the machine bed 3, the machine casing 13, the partitioning wall 9 to the working area and a transfer door 14, the transfer door 14 closing the loading lock off oil mist and splash proof from the machine surroundings. FIG. 5 shows an outside view of the work piece sector of the machine with the transfer door 14 closed. The transfer door 14 is only open when the machined and centrifuged work piece is removed from the loading lock 15 and a new blank is loaded. This takes place exclusively with the loading doors 10, 11 closed.

In a preferred embodiment of the invention the transfer platform 8 is a work fixture located for rotation in the machine bed, on which fixture the finished part deposited by the work grippers 16 is cleared of oil residue and swarf by rotation prior to its removal and replacement with a new work blank. In order to prevent the transmission of vibration to the machine during centrifuging, the rotating transfer platform 8 is vibration insulated from the machine bed 3 or installed directly on the floor. In order to avoid a soiling of the transfer area 20 during centrifuging, it is an advantage to provide a lowerable splash cover for the transfer platform 8 (not shown in the illustrations), in particular in the form of a hood lowerable over the finished component.

In an alternative embodiment of the invention the swivel shaft 4 and the transfer platform 8, complete with partitioning wall 9 with loading doors 10, 11 and transfer door 14, are arranged separated from the machine bed 3 and the machine casing 13 as an independent loading and centrifuging module directly on the floor in a separate casing, which is connected oil mist and splash proof with the machine casing. Such a modular solution is exemplified in simplified form in FIGS. 6 and 7, the FIG. 6 showing the gear manufacturing machine with module connected, whilst in FIG. 7 the module is retracted from the machine.

In the upper section of FIG. 6, 7 the gear manufacturing machine is shown with the machine bed 3 and the machine working area 12 above it. The machine working area 12 is surrounded by the machine casing 13. Shown on the machine bed 3 at the machining point 7 is the work spindle 1 with a clamped work piece 2. For the machining of the work piece (gear) 2 a tool 18, e.g. a grinding worm rotating about an axis of rotation is provided.

The loading and unloading of the machine working area 12 with the workpieces takes place by means of the separate, retractable module which is designed as a loading lock 15, and is shut off all round from the surroundings by its own casing. Within the casing of the module, towards the machine sector, vertically displaceable loading doors 10 and 11 are provided, through which in the open state the workpieces 2 can be exchanged between the inside of the loading lock 15 (transfer area) and the machine working area 12. The casing of the module simultaneously serves as partitioning wall 9 to divide the machine working area 12 from the transfer area. On the opposite side of the module casing a transfer door is provided, through which the workpieces 2 can be exchanged between the loading lock 15 and the surrounding room.

Part of the module is the swivel mechanism with the swivel shaft 4, the two swivel arms 5, 6 and the grippers 16 attached to the latter. In the construction shown here the transfer platform 8 is retractable out of the loading lock 15 through the transfer door 14 on a horizontally displaceable slide 19, where an extraction mechanism can perform the exchange of the workpieces 2 in a simple manner.

An advantage of this variant is that by omitting the module and closing the machine casing 3 with a simple wall, the machine can be designed as a cheaper hand loaded machine variant instead of being automatically loaded. The module requires no independent supply systems, but can be connected to the internal systems of the gear manufacturing machine, in particular with respect to the coolant/lubricating system, oil mist extraction, hydraulic, pneumatic, electrical, and control systems.

With respect to the primary external work piece loading system the proposed solution is very flexible. If, for example, the customer only requires a minimum automation, the scope of the present invention comprises the entire loading system without any further equipment. If, on the other hand, connection to the primary link-up of a production system must be realized, the workpieces can be discharged already de-oiled to an easily accessible pick-up point.

A machine equipped with a loading system according to the present invention can also be easily supplemented with an automation cell with various kinds of work piece storage system.

The description of the invention refers to a hard finishing machine for toothed workpieces with vertically arranged work axis. This is the design on which most concepts of this machine type are based. The invention is also applicable, however, for differently positioned work axes and machining processes.

LIST OF REFERENCE NUMBERS

1 Work spindle
2 Work piece
3 Machine bed
4 Swivel shaft
5,6 Swivel arm
7 Machining position
8 Transfer platform
9 Partitioning wall
10,11 Loading door
12 Machine working area
13 Machine casing
14 Transfer door
15 Loading lock
16 Work piece grippers
17 Lip seals
18 Tool
19 Slide
20 Transfer area The invention claim is:

1. A gear manufacturing machine, comprising:
a machine bed (3), and
a machine working area (12) arranged above the machine bed (3),
wherein said working area (12) contains a machining position (7), a transfer area (20) that can be closed off from the working area arranged adjacent to the working area (12) having a transfer platform (8) rotationally fixed on the transfer area and a swivel device (4, 5, 6) rotationally fixed on the transfer area for automatically loading a work piece,
wherein said swivel device in one and a same loading cycle rotates to deposit a finished work piece in a first arm of the swivel device from the machine working area (12) onto the transfer platform (8) and simultaneously moves a work piece blank in a second arm of the swivel device from the transfer platform (8) into the machine working area (12) for grinding,
wherein rotation of the transfer platform (8) around a vertical axis thereof forms a centrifuge station which when rotated cleans the finished work piece on the transfer platform when the transfer area is closed.

2. Gear manufacturing machine according to claim 1, wherein a fixed partitioning wall (9) is located between the machine Working area (12) and the transfer area (20), the said partitioning wall being provided with closable openings (10, 11) through which the work piece blank and the finished component are swung unhindered, and which said wall (9) in the closed state separates the machine working area (12) oil mist and splash proof from the transfer area (20).

3. Gear manufacturing machine according to the claim 2, wherein to close the openings in the partitioning wall (9) loading doors (10,11) are provided, which are arranged for displacement in the plane of the partitioning wall (9).

4. Gear manufacturing machine according to claim 1, wherein the swivel device (4, 5, 6) comprises a swivel shaft (4) located for swiveling about a vertical axis and for raising and lowering, said shaft being fitted with the first arm and the second arm (5, 6) arranged mutually opposite.

5. Gear manufacturing machine according to claim 4, wherein the transfer area (20) is designed as a loading lock (15) enclosed by the machine bed (3), a machine casing (13), the partitioning wall (9) to the machine working area (12) and a transfer door (14), the transfer door (14) closing off this loading lock (15) oil mist and splash proof from the machine surroundings.

6. Gear manufacturing machine according to claim 5, wherein the transfer door (14) and the openings in the partitioning wall (9) cannot be opened simultaneously.

7. Gear manufacturing machine according to either of the claims 5 or 6, wherein the openings in the partitioning wall (9) and the transfer door (14) can be opened and closed automatically.

8. Gear manufacturing machine according to claim 5, wherein the swivel shaft (4) and the transfer platform (8) together with partitioning wall (9) with loading doors (10, 11) and transfer door (14) are arranged separate from the machine bed (3) and the machine casing (13) as a separate module directly on a floor in a separate casing, which is connected oil mist and splash proof to the machine casing (13).

9. Gear manufacturing machine according to claim 8, wherein the module is detachable from a rest of the machine.

10. Gear manufacturing machine according to claim 8 or 9, wherein an own supply of operating media the module can be connected to internal operating media supplies of the gear manufacturing machine, with respect to coolant/lubricant, oil mist extraction, hydraulic, pneumatic, electrical, and control systems.

11. Gear manufacturing machine according to claim 4, wherein the first and second swivel arms (5, 6) are designed as automatically actuated work piece grippers (16).

12. Gear manufacturing machine according to claim 4, wherein the first and second swivel arms (5, 6) are designed as form-locking work piece support elements.

13. Gear manufacturing machine according to claim 4, wherein the swivel shaft (4) bearing the first and second swivel arms (5, 6) is cylindrical.

14. Gear manufacturing machine according to claim 4, wherein the swivel shaft (4) bearing the first and second swivel arms (5, 6) is supported at both ends for swiveling and for axial displacement.

15. Gear manufacturing machine according to claim 4, wherein the loading doors (10, 11) are provided with lip seals (17) on their edges which engage a swept surface of the swivel shaft (4).

16. Gear manufacturing machine according to claim 1, wherein the finished work piece on the transfer platform (8) can only be centrifuged when the transfer area is closed.

17. Gear manufacturing machine according to claim 1 or 16, wherein the transfer platform (8) is vibration insulated relative to the machine bed (3), or is installed directly on a floor independent of the machine bed (3)

18. Gear manufacturing machine according to claim 1, wherein the transfer platform (8) is arranged on a slide (19) retractable out of the transfer area (20) for loading and unloading from above.

19. Gear manufacturing machine according to claim 1 wherein a lowerable splash cover is provided in the transfer area (20) to cover the work piece (2) during centrifuging, in particular in the form of a hood lowerable over the finished work piece.

* * * * *